Dec. 22, 1931. H. W. HARTZELL 1,837,546
ANTIGLARE SHIELD
Filed Dec. 18, 1928 2 Sheets-Sheet 1
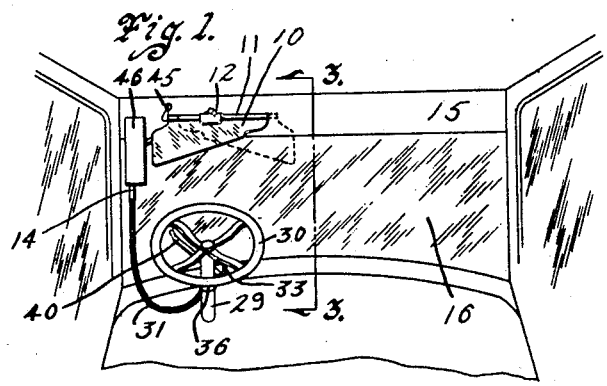
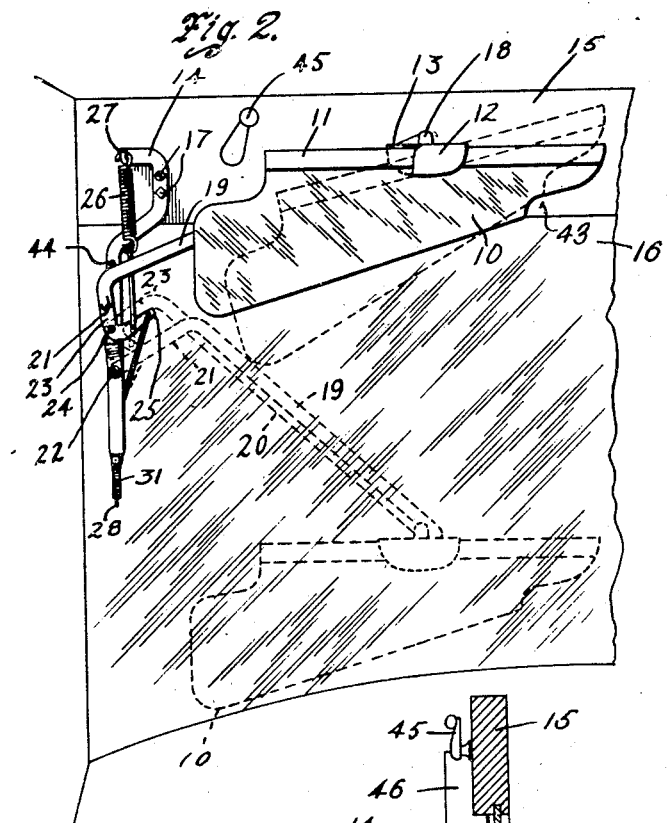
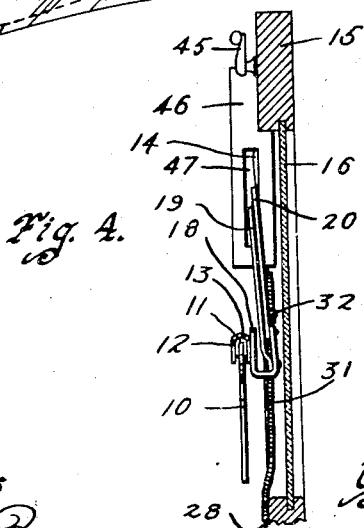
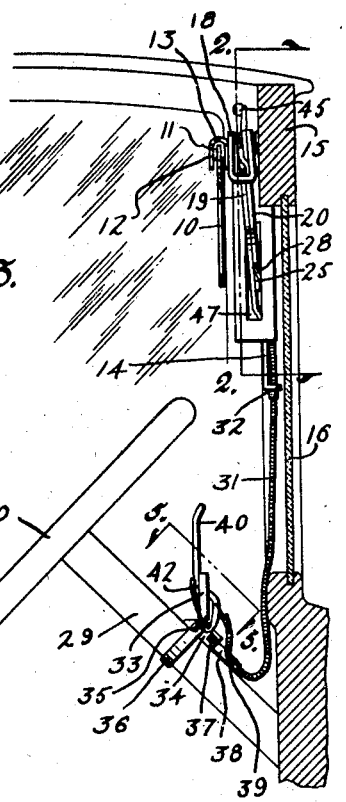
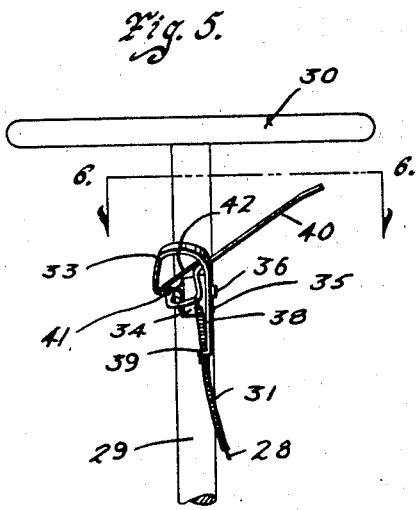
Inventor
Harry W. Hartzell
by Bair, Freeman & Sinclair
Attorneys
Witness
Vincent Brown Dec. 22, 1931. H. W. HARTZELL 1,837,546
ANTIGLARE SHIELD
Filed Dec. 18, 1928 2 Sheets-Sheet 2
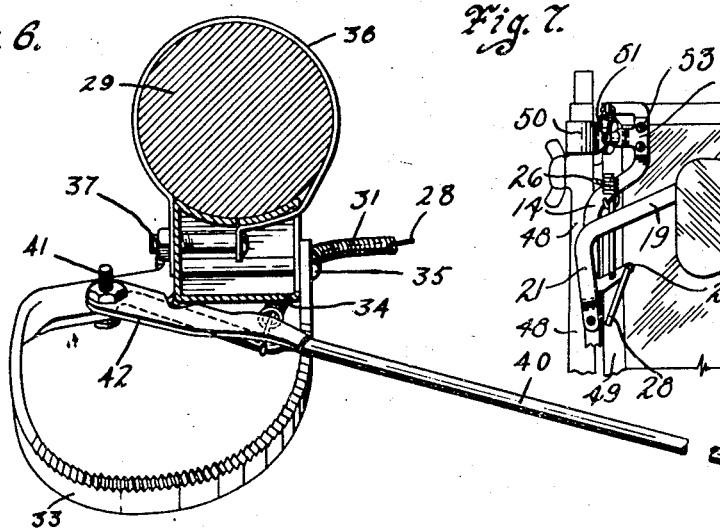
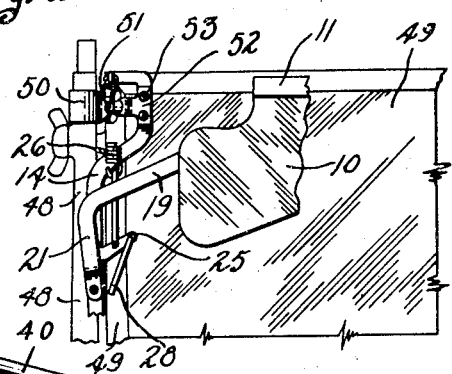
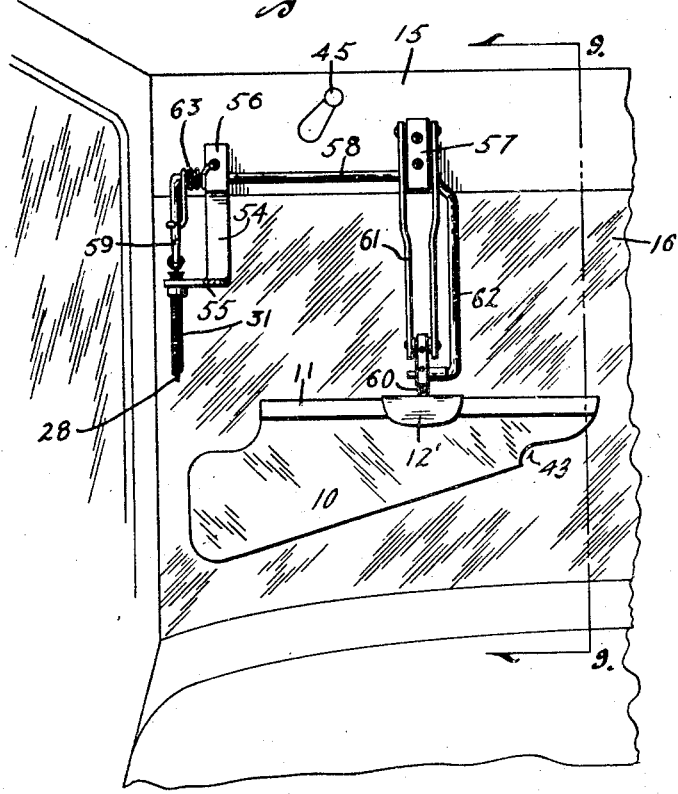
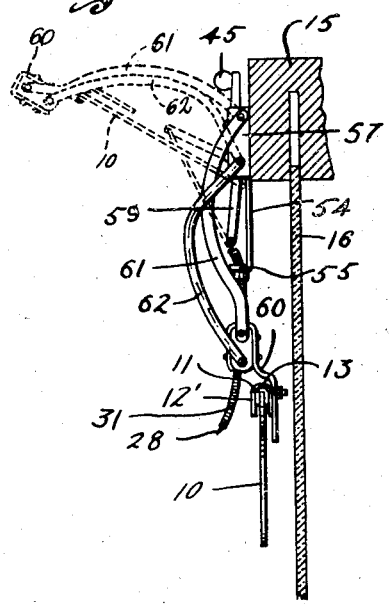
Inventor
Harry W. Hartzell
by Bair, Freeman & Sinclair
Attorneys
Witness
Vincent Brown.

Patented Dec. 22, 1931

1,837,546

UNITED STATES PATENT OFFICE

HARRY W. HARTZELL, OF MADISON, KANSAS

ANTIGLARE SHIELD

Application filed December 18, 1928. Serial No. 326,818.

This application is a continuation in part of my application filed September 4, 1928, Serial Number 303,768.

The object of this invention is to provide an improved construction for an anti-glare shield for motor vehicles so arranged that it may be operated from one position to another through mechanism positioned adjacent the steering wheel.

A further object of the invention is to provide an anti-glare shield, which normally is held by yielding pressure devices in an inoperative position at the upper forward portion of a vehicle and which may be moved to operative position by means of a controlling member mounted on the steering column so that it is unnecessary for the operator to reach forwardly and upwardly for moving the shield from one position to another.

Still another object of the invention is to provide an anti-glare shield which is adjustably and removably mounted so that it may be placed in any desired position for use in driving toward the sun or toward the head lights of approaching vehicle.

A further object of the invention is to provide a simple and efficient operating means for an anti-glare shield and one which is positioned and arranged so that it does not obstruct vision through the windshield.

A still further object of the invention is to provide means for automatically retracting the shield to inoperative position when the lever controlling the same is released.

Still another object is to provide a shield which is so formed along its lower margin as to provide a maximum of visibility relative to the road in front of the vehicle and at the same time give maximum protection against headlights as they approach the vehicle on which the device is mounted.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is an interior elevation of the forward portion of a motor vehicle equipped with my improved mechanism, which is shown in inoperative position, the dotted lines indicating the reversed position of the shield.

Figure 2 is a similar view on a larger scale, the housing being removed from a portion of the mechanism and dotted lines indicating various positions which may be assumed by the shield, including one of the operative positions.

Figure 3 is a sectional view on the line 3—3 of Figure 1.

Figure 4 is a sectional view similar to Figure 3, but illustrating the device in operative position.

Figure 5 is an elevation on the line 5—5 of Figure 3, illustrating the controlling means mounted on the steering column.

Figure 6 is a sectional view on the line 6—6 of Figure 5, illustrating the operating mechanism.

Figure 7 is an interior elevation of an adaptation, illustrating how the supporting bracket may be mounted on an open type vehicle.

Figure 8 is an interior elevation illustrating a modified form of the invention as mounted for practical use.

Figure 9 is a sectional view on the line 9—9 of Figure 8, the dotted lines indicating the parts in inoperative position.

Many forms of bright light or anti-glare shields have been devised heretofore and some of them are reasonably efficient for the purpose for which they are designed when the shield is placed in operative position, but so far as I have been able to learn, all of these devices require that the operator reach forwardly and upwardly whenever it is necessary to move the shield from operative to inoperative position or vice versa.

I have designed a shield of this character which is of the disappearing type or in other words, is capable of being moved to a position substantially behind the frame member at the top of a windshield and which is provided with what I have designated as a "remote control". That is to say, the movement of the shield from operative to inoperative position and vice versa, is governed by a mechanism which is located on the steering column of the vehicle and which may be actuated by the driver without the necessity of moving his hands any considerable distance from the steering wheel.

This mechanism consists of a lever engaging a notched segment on the steering column and connected by a flexible cable or wire extending through a conduit and connected with the arms which carry the shield. By moving the lever in one direction, the shield is drawn down to operative position and is held in such position by engagement of the lever with the segment.

Upon release of the lever, a spring acts to retract the shield to inoperative position.

Furthermore, the shield itself is of a peculiar formation, particularly along its lower margin, so that the driver is able to look beneath the shield even when it is in operative position for observing the roadway and at the same time, the shield provides a maximum of protection against approaching headlights even up to the point where such headlights pass the vehicle on which the mechanism is mounted. In addition to this, the shield is adjustable longitudinally as well as on an arc and is also reversible so that it may be positioned to the right hand side of the driver for use when driving against the sun or against headlights approaching from the right.

In carrying out my invention, I employ a translucent shield 10, which may be formed of suitably colored celluloid or other suitable material. The upper margin of the shield 10 is substantially straight and is provided with a metal binding strip 11.

For mounting the shield, I have provided a clamp member 12 which is channel-shaped and opens downwardly and is adapted to frictionally engage the binder strip 11 of the shield. The clamp member 12 preferably is elongated so that sufficient frictional contact is secured for holding the shield in any position in which it may be placed manually relative to the clamp.

To permit a tilting of the shield 10, which may be desirable at times, I have shown the clamp member 12 as formed with notches 13 in the end portions of its upper wall, as indicated in Figure 2, one only of the notches being shown. A bracket 14 is provided, which bracket may be mounted on the frame member 15, which extends across the forward portion of vehicles of the closed type above the windshield 16. When the mechanism is applied to vehicles of this type, the bracket may be mounted by means of screws or the like 17 extending into the rear or inner face of the frame member 15 near the left hand end thereof. The bracket 14 is arranged in substantially vertical position and extends downwardly from the frame member 15 along the left hand end of the windshield 16.

Fixed to one face of the clamping member 12 is an upwardly opening U-shaped clip 18, which lies between said clamping member and the frame member 15 or the windshield 16, depending upon the position of the shield.

A pair of parallel arms are provided, which I have designated by the numerals 19 and 20 and said arms are arranged so that they occupy positions side by side and close together. The arm 19 is formed at one end with a downward extension 21, which is pivoted at its lower end on the bracket 14 by means of a screw or rivet 22. The arm 20 is formed at one end with a downward extension 23, which is of less length than the extension 21 and is pivoted to the bracket 14 at the point 24.

The extension 21 is offset near its lower end so that the extension 23 may lie between said member and the bracket. The arms 19 and 20 extend transversely from the bracket 14 and have their opposite ends pivoted to one arm of the U-shaped clip 18. As shown, the arm 20 is pivoted to the upper end of the clip 18, while the arm 19 is turned downwardly and is pivoted to the lower part of said clip.

The spacing of the pivot points of the arms 19 and 20 are equal and the spacing of pivots to the clip 18 corresponds with the spacing of pivots to the bracket 14 so that as said arms are oscillated, the clamp 12 and consequently the shield 10, will be moved up and down and maintain approximately the same horizontal position as indicated in Figure 2.

The extension 23 of the arm 20 is formed at its lower end with a projection 25, which extends toward the median line of the vehicle and which is connected to a retractile coil spring 26, having its opposite end secured to an apertured ear 27 formed at the upper part of the bracket. It is the function of the spring 26 normally to retract the parallel arms 19 and 20 and with them, the clamp 12 and shield 10 and to hold them in uppermost position where the shield will be, to a great extent, concealed behind the frame member 15.

An operating wire or cable 28 is pivotally attached to the free end of the projection 25 and said wire extends to a position near the steering column 29 of the vehicle and preferably, to a point slightly below the steering wheel 30.

The operating wire or cable 28 preferably is slidably mounted in a flexible conduit 31, which may be attached at its upper end to a laterally directed apertured ear 32 at the lower end of the bracket 14.

Suitably fixed to the upper end portion of the steering column 29 is a notched segment 33, which has its ends secured to an anchor block 34 by means of a bolt 35. The anchor block is attached to the steering column 29 by means of a clamping strip 36 encircling the steering column and secured at its ends to the anchor block by means of a bolt 37.

By this means, the notched segment may be secured in any desired position on the steering column and inasmuch as the clamping strip 36 is of flexible character, it may be employed on a steering column of any size or cross sectional shape.

The notched segment 33 is formed at one end with a downwardly projecting extension 38 terminating in an apertured ear 39 through which the flexible conduit 31 extends and to which it is fastened.

An operating lever 40 is pivoted at one end to the segment 33 by means of a bolt or the like 41 and said lever extends across and is in engagement with the notched portion of the segment.

The lever 40 is offset downwardly between its pivot and that portion which engages the notched portion of the segment and to this offset portion, the operating cable 28 is pivotally attached.

By forming the offset in the lever 40 near its fulcrum, I have arranged that there is a substantially direct pull on the wire 28 when said lever is oscillated, rather than a lateral movement of the end of the wire which would cause it to rub against the end of the conduit.

A leaf spring 42 is mounted on the bolt 41 and has a portion engaging the lever 40 near the point of engagement with the notched part of the segment for holding said lever in any position in which it may be placed manually.

The operating lever 40, which is located near the steering wheel 30, may be actuated by a very slight movement of one hand of the driver for exerting a pull on the wire 28 and through said wire on the projection 25 of the arm 20, whereby said arm is oscillated to move the clip 18, clamp 12 and shield 10 downwardly. In such movement the arm 19 of course has a corresponding movement and serves to maintain the clamp 12 in normal horizontal position and thereby to maintain the shield in its position of adjustment in the clamp irrespective of its vertical position, due to the equal spacing of pivot points on bracket and clip.

The operating lever 40 will be held by the spring 42 against the notched segment so that the shield is thereby maintained in the desired position.

Upon release of the operating lever 40 manually and its return to its original position (which is shown in Figure 6), the spring 26 acts to return the arm 20 to its normal position, thereby raising the shield 10 to inoperative position, shown in Figure 1.

This method of remote control for the shield, whereby it may be caused to move to operative or inoperative position without the necessity on the part of the driver of reaching to any considerable distance from the steering wheel, is of great importance from the standpoint of safety, ease and convenience.

The shield 10 may be moved longitudinally in the clamp 12 and may also be tilted at an angle as indicated by dotted lines in the upper part of Figure 2, whereby it will serve for various conditions which may be encountered in driving.

Furthermore, the shield may be entirely removed from the clamp 12 and reversed, as indicated by dotted lines in Figure 1, which makes it more suitable for driving against the sun or against headlights approaching from the right hand side of the driver.

In this connection, the peculiar formation of the shield 10 particularly as to its lower margin should be carefully noted.

I prefer to form the shield of greater width at its left end (referring to its normal position), the lower margin being inclined upwardly toward the right hand end of the binder strip 11 and terminating in a notched portion 43. The notched portion 43 permits the driver to keep one eye on the roadway of his vehicle without looking through the shield, while the increasing width of the shield toward its left end provides that approaching headlights will be covered and shielded by the shield, as they approach the vehicle on which it is mounted.

This arrangement affords a maximum of protection against approaching headlights and at the same time permits an unobstructed view of the roadway.

I have provided a stop 44 on the bracket 14, which is engageable by the arm 19 to limit upward movement of the shield 10 under the influence of the spring 26.

That part of the bracket 14 to which the arms 19 and 20 are pivoted, preferably is slightly inclined from a vertical plane so that said arms in their downward movement will travel slightly forwardly toward the windshield 16 and away from the steering wheel and operating lever, as is indicated particularly in Figure 4. Likewise, in its upward movement, the shield will be carried somewhat rearwardly relative to the frame member 15 and windshield operating elements such as 45, which may be carried thereby.

If desired, a housing 46 may be provided to cover and inclose the major part of the bracket 14 and elements carried thereby, said housing being formed at one side with a slotted opening 47 through which the arms 19 and 20 extend.

In vehicles of the open type, a different method of mounting the glare shield is required and this is shown in Figure 7. In this type of car, there is employed a metal post 48 which helps carry the vehicle top (not shown) and also the windshield 49. A clamping member 50 embraces the post 48 and is held in place by means of a clamping bolt 51. The clamping member is formed with a laterally directed arm 52, to which the bracket 14 is secured by small bolts or rivets 53. The bracket and members connected therewith may be the same as previously described.

In Figures 8 and 9, I have illustrated a modified form of mechanism for mounting the glare shield, which is particularly applicable to closed vehicles of the type having the frame member 15, such as previously described.

For this mounting I employ a bracket 54, which is suitably attached to the frame member 15 and extends downwardly, having at its lower end a horizontal flange 55. The flange 55 is designed to provide a support for the upper end of the conduit 31 which receives the operating wire or cable 28.

The upper end of the bracket 54 is formed as a bearing 56 and a second bearing 57 is mounted on the frame member 15 in alignment with the bracket 56.

A rock shaft 58 is journaled in the bearings 56 and 57 and has at its left hand end a right-angled crank 59, to which the upper end of the operating wire 28 is pivotally connected.

The clamp 12', which carries the shield member 10 is similar to the one previously described, but it is provided with an upwardly extending lug 60.

A supporting arm 61 is pivoted to the lug 60 and to the upper end of the bearing 57. The supporting arm 61 preferably is of double formation, or in other words, is made of two parallel portions which straddle the lug 60 and the bearing and this arm preferably is bowed or arched rearwardly between its ends.

On its inner end the rock shaft 58 is formed with a crank arm 62 which is arranged substantially parallel with the supporting arm 61 and is pivoted at its free end to the lug 60 at a point between the shield 10 and the point of connection of the supporting arm to said lug.

A spring 63 is coiled on the rock shaft 58 and has one end suitably attached to a fixed member such as the bearing 56, while its opposite end extends along the crank arm 59 and is connected thereto in such manner as to normally cause the rock shaft to be rotated to a position where said crank arm will extend upwardly or lie in a position above the horizontal plane of the rock shaft, as illustrated by dotted lines in Figure 9.

When the parts are in this position, the supporting arm 61 and crank arm 62 extend rearwardly from the frame member 15 just beneath the roof of the vehicle and the shield 10 is folded rearwardly to a position directly beneath said arms. This position of the shield is caused by the lower pivotal connection of the crank arm 62 to the lug 60 and is permitted by the upward curvature of the supporting arm 61 and crank arm 62, as will be clearly evident from the dotted showing in Figure 9.

The operating means for this type of shield may be the same as previously described and when the operating lever 40 is moved to cause a downward pull on the wire 28, such pull is transmitted to the crank arm 59 and causes a rotary oscillation of the rock shaft 58.

This movement through the crank arm 62 causes the clamp member 12' and shield 10 to be moved rearwardly and downwardly, whereby the shield assumes a substantially vertical position just back of the windshield, as shown in Figure 8 and by the solid lines in Figure 9.

When the operating lever 40 is released, the spring 63 acts to return the rock shaft and shield to inoperative position.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A glare shield for motor vehicles comprising a supporting arm pivotally mounted on an axis substantially perpendicular to the windshield of a vehicle, a clamp member pivoted on the free end of said arm, a shield member slidably mounted in said clamp member, a second arm pivotally mounted substantially parallel with the supporting arm and having a pivotal connection to said clamp member, said second arm operating positively to prevent tilting of said clamp member during oscillation of the supporting arm, whereby the clamp member and with it the shield member may be raised and lowered bodily in a plane substantially transversely of the vehicle, all of said pivotal connections being on parallel axes so that the shield remains substantially parallel with and close to the windshield in all positions of adjustment, means for manually oscillating said supporting arm for placing said shield in position for use, the actuating means being located at a point remote to the supporting arm and adjacent the steering wheel of the vehicle, and a flexible member for connecting the actuating means to said supporting arm.

2. A glare shield for vehicles comprising a bracket mounted at one lateral end of and behind a windshield, a shield, a shield-carrying member, a pair of parallel arms each pivoted at one end to the bracket and at the other end to the shield-carrying member, all of the pivots being parallel to the longitudinal axis of the vehicle, whereby the shield may be moved up and down in a substantially vertical plane, one of said arms being formed with a bell-crank projection, spring means connected to said projection for urging the arms upwardly, and a manually actuated operating member connected to said projection for moving the arms downwardly.

Des Moines, Iowa, November 27, 1928.

HARRY W. HARTZELL.